(12) United States Patent
Guidi et al.

(10) Patent No.: US 9,879,779 B2
(45) Date of Patent: Jan. 30, 2018

(54) SELF-RETAINING GASKET

(71) Applicants: DENSO International America, Inc., Southfield, MI (US); DENSO CORPORATION, Kariya-shi, Aichi-ken (JP)

(72) Inventors: Paolo Guidi, Macomb, MI (US); Blaise DiDonato, Keego Harbor, MI (US); Kyle Renno, Port Huron, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 13/791,023

(22) Filed: Mar. 8, 2013

(65) Prior Publication Data

US 2014/0252724 A1 Sep. 11, 2014

(51) Int. Cl.
F16J 15/06 (2006.01)

(52) U.S. Cl.
CPC .................. *F16J 15/061* (2013.01)

(58) Field of Classification Search
CPC ........................................ F16J 15/061
USPC .................. 277/598, 616, 630, 637, 640
See application file for complete search history.

(56) References Cited

U.S. PATENT DOCUMENTS

| | | | | |
|---|---|---|---|---|
| 350,020 A * | 9/1886 | Shipman | ........................ | 24/627 |
| 622,899 A * | 4/1899 | McDondland | ................ | 277/637 |
| 922,132 A * | 5/1909 | Gold | ..................... | F16L 37/122 |
| | | | | 277/613 |
| 1,435,887 A * | 11/1922 | Anderson | .......... | B25B 27/0028 |
| | | | | 24/551 |
| 1,681,729 A * | 8/1928 | Gold et al. | ...................... | 285/76 |
| 1,985,473 A * | 12/1934 | Victor | ............................ | 277/593 |
| RE24,065 E * | 10/1955 | Bergstrom | ...................... | 403/14 |
| 3,080,171 A * | 3/1963 | Booth | ........................... | 277/622 |
| 3,622,167 A * | 11/1971 | Velthoven | ..................... | 277/640 |
| 3,955,834 A * | 5/1976 | Ahlrot | ........................... | 285/110 |
| 4,003,120 A * | 1/1977 | Hopp | ............................. | 29/278 |
| 4,245,652 A * | 1/1981 | Kelly et al. | ................... | 600/549 |
| 4,250,599 A * | 2/1981 | Nagashima et al. | ............ | 24/326 |
| 4,298,206 A * | 11/1981 | Kojima | ......................... | 277/626 |
| 4,402,118 A * | 9/1983 | Benedetti | ........................ | 24/289 |
| 4,756,561 A * | 7/1988 | Kawata | ............... | F01N 13/1827 |
| | | | | 277/592 |
| 4,819,954 A * | 4/1989 | Fucci et al. | .................... | 277/598 |
| 5,044,641 A * | 9/1991 | Belter | ............................ | 277/598 |
| 5,203,576 A * | 4/1993 | Miyaoh et al. | ............... | 277/598 |
| 5,269,540 A * | 12/1993 | Nobuchi et al. | .............. | 277/591 |
| 5,333,884 A | 8/1994 | Miyaoh et al. | | |
| 5,340,170 A * | 8/1994 | Shinohara et al. | ........... | 285/379 |
| 5,366,261 A * | 11/1994 | Ohmi et al. | ................... | 285/328 |
| 5,367,975 A * | 11/1994 | Hamilton et al. | ............. | 114/347 |
| 5,375,851 A * | 12/1994 | Mockenhaupt | ............... | 277/598 |
| 5,544,902 A * | 8/1996 | Belter | ..................... | F16J 15/061 |
| | | | | 277/598 |

(Continued)

*Primary Examiner* — Kristina Fulton
*Assistant Examiner* — L. Susmitha Koneru
(74) *Attorney, Agent, or Firm* — Harness, Dickey & Pierce, P.L.C.

(57) ABSTRACT

A self-retaining gasket including a main body, a first retention tab, and a second retention tab. The main body includes a first surface and a second surface opposite to the first surface. The main body defines a first aperture extending between the first surface and the second surface. The first retention tab and the second retention tab extend from the main body at the first aperture.

18 Claims, 2 Drawing Sheets

(56) References Cited

U.S. PATENT DOCUMENTS

| | | | | |
|---|---|---|---|---|
| 5,564,756 A * | 10/1996 | Hamilton | | 285/222 |
| 5,645,282 A * | 7/1997 | Belter | | F16J 15/061 |
| | | | | 277/598 |
| 5,673,920 A * | 10/1997 | Mockenhaupt | | 277/630 |
| 5,791,660 A * | 8/1998 | Belter | | 277/598 |
| 5,895,056 A * | 4/1999 | Habuta et al. | | 277/598 |
| 5,926,921 A * | 7/1999 | Benoit | | 24/16 PB |
| 6,101,686 A * | 8/2000 | Velthoven et al. | | 24/295 |
| 6,119,316 A * | 9/2000 | Ishihara et al. | | 24/297 |
| 6,142,539 A * | 11/2000 | Redemann et al. | | 285/379 |
| 6,179,298 B1 * | 1/2001 | Schweiger | | 277/598 |
| 6,231,050 B1 | 5/2001 | Raden | | |
| 6,317,937 B1 * | 11/2001 | Ishihara et al. | | 24/297 |
| 6,367,802 B1 * | 4/2002 | Knapp | | 277/314 |
| 6,435,517 B1 | 8/2002 | Belter | | |
| 6,438,804 B1 * | 8/2002 | Romero Magarino | | 24/289 |
| 6,449,814 B1 * | 9/2002 | Dinsmore et al. | | 24/297 |
| 6,474,700 B2 * | 11/2002 | Redemann et al. | | 285/379 |
| 6,527,471 B2 * | 3/2003 | Smith et al. | | 403/291 |
| 6,533,287 B1 * | 3/2003 | Belter | | 277/598 |
| 6,533,288 B1 * | 3/2003 | Brandner et al. | | 277/630 |
| 6,562,477 B1 * | 5/2003 | Leon et al. | | 428/500 |
| 6,708,979 B2 * | 3/2004 | Stratman et al. | | 277/316 |
| 6,857,168 B2 * | 2/2005 | Lubera et al. | | 24/293 |
| 6,893,024 B2 * | 5/2005 | Belter | | 277/598 |
| 6,994,354 B2 * | 2/2006 | Sakata | | 277/598 |
| 7,204,000 B2 * | 4/2007 | Benedetti et al. | | 24/295 |
| 7,234,209 B2 * | 6/2007 | Totani et al. | | 24/607 |
| 7,320,157 B2 * | 1/2008 | Lubera et al. | | 24/295 |
| 7,347,224 B2 * | 3/2008 | Nohara et al. | | 138/109 |
| 7,364,166 B2 * | 4/2008 | Yoakam et al. | | 277/616 |
| 7,624,992 B2 * | 12/2009 | Westhoff et al. | | 277/616 |
| 7,775,770 B2 * | 8/2010 | Carbaugh | | 416/155 |
| 8,061,948 B2 * | 11/2011 | Degelis | | 411/546 |
| 8,448,949 B2 * | 5/2013 | Stewart et al. | | 277/317 |
| 2004/0021271 A1 * | 2/2004 | Tratnik | | 277/616 |
| 2006/0145429 A1 * | 7/2006 | Casler et al. | | 277/627 |
| 2008/0258407 A1 * | 10/2008 | Schimanski et al. | | 277/619 |
| 2013/0277921 A1 * | 10/2013 | Kozlowski et al. | | 277/637 |
| 2013/0313824 A1 * | 11/2013 | Bailey et al. | | 285/379 |

* cited by examiner

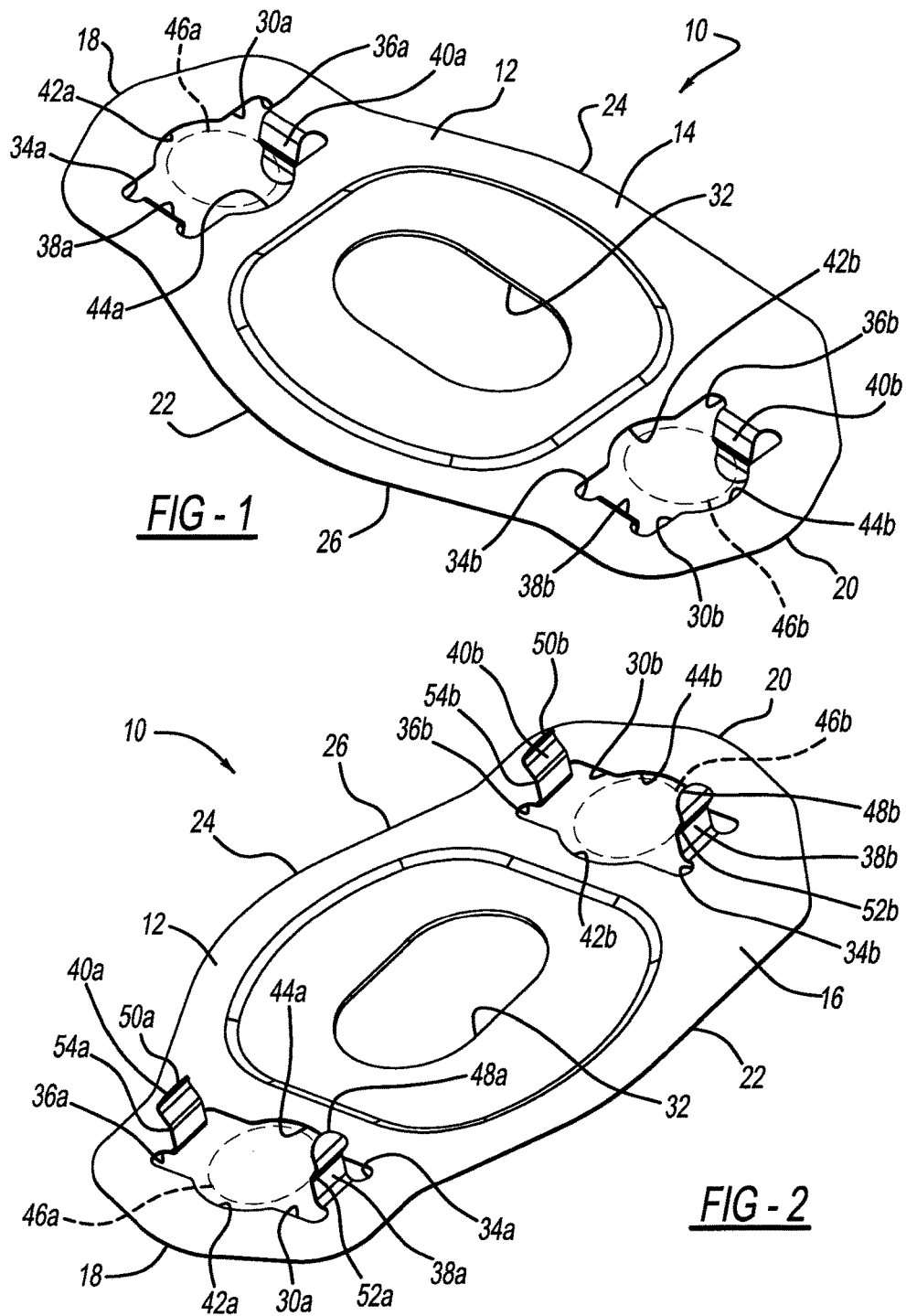

SELF-RETAINING GASKET

FIELD

The present disclosure relates to a self-retaining gasket.

BACKGROUND

This section provides background information related to the present disclosure, which is not necessarily prior art.

A gasket is a mechanical seal typically positioned at an interface or joint between two joined objects on a mating surface of one or both of the objects. The gasket provides a seal between the objects to prevent leakage of fluid or other material into or out of the objects. The gasket is typically positioned between the two objects by an assembler, which results in an additional assembly step that increases production time and cost. It would thus be desirable for the gasket to be prepositioned on the mating surface and coupled thereto prior to joinder of the two objects during assembly.

SUMMARY

This section provides a general summary of the disclosure, and is not a comprehensive disclosure of its full scope or all of its features.

The present teachings provide for a self-retaining gasket including a main body, a first retention tab, and a second retention tab. The main body includes a first surface and a second surface opposite to the first surface. The main body defines a first aperture extending between the first surface and the second surface. The first retention tab extends from the main body at the first aperture. The second retention tab extends from the main body at the first aperture.

The present teachings further provide for a self-retaining gasket including a main body, a first retention tab, a second retention tab, and a first fastener clearance. The main body includes a first surface and a second surface opposite to the first surface. The main body defines a first aperture extending between the first surface and the second surface. The first retention tab extends from the main body at the first aperture, and extends beyond the second surface. The second retention tab extends from the main body at the first aperture beyond the second surface. The first fastener clearance is defined by the first aperture between the first retention tab and the second retention tab. The first fastener clearance is spaced apart from each of the first retention tab and the second retention tab to accommodate a fastener within the first aperture spaced apart from each of the first retention tab and the second retention tab.

The present teachings also provide for a self-retaining gasket including a main body with a first surface and a second surface opposite to the first surface. The main body defines a first aperture, a second aperture, and a third aperture between the first aperture and the second aperture. Each of the first, second, and third apertures extend between the first surface and the second surface. A first retention tab and a second retention tab each extend from the main body at opposite sides of the first aperture. The first and second retention tabs extend beyond the second surface. A third retention tab and a fourth retention tab each extend from the main body at opposite sides of the second aperture. The third and the fourth retention tabs extend beyond the second surface. A first fastener clearance is defined by the first aperture between the first retention tab and the second retention tab. A second fastener clearance is defined by the second aperture between the third and fourth retention tabs. The first fastener clearance is spaced apart from each of the first retention tab and the second retention tab to accommodate a first fastener within the first aperture spaced apart from each of the first retention tab and the second retention tab. The second fastener clearance is spaced apart from each of the third retention tab and the fourth retention tab to accommodate a second fastener within the second aperture spaced apart from each of the third retention tab and the fourth retention tab.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a perspective view of a first side of a self-retaining gasket accordance to the present teachings;

FIG. 2 is a perspective view of a second side of the gasket of FIG. 2.

Corresponding reference numerals indicate corresponding parts throughout the several views of the drawings.

DETAILED DESCRIPTION

Figure 3:
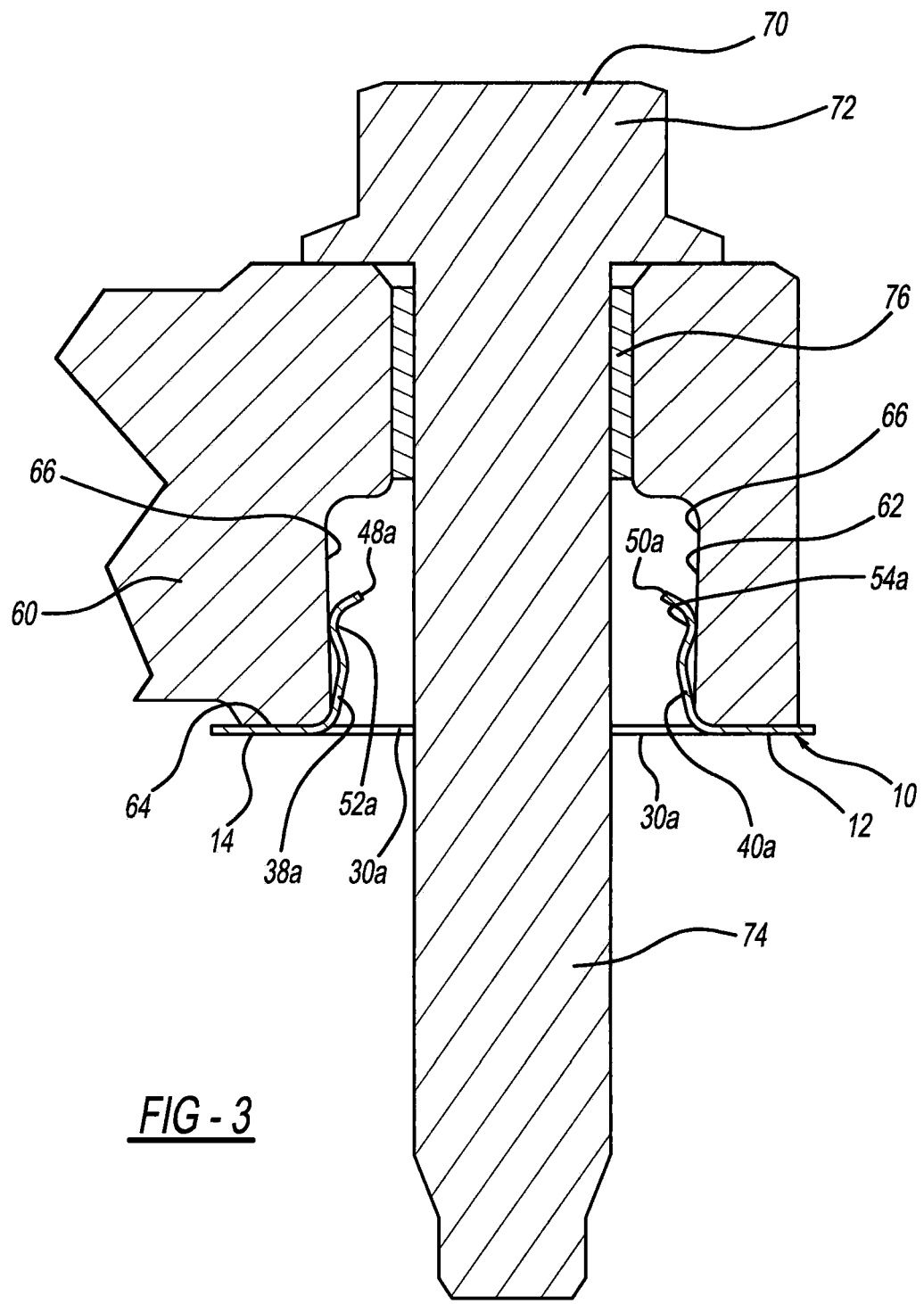
FIG. 3 is a cross-sectional view of the gasket coupled to a part.

Example embodiments will now be described more fully with reference to the accompanying drawings.

With initial reference to FIGS. 1 and 2, a self-retaining gasket according to the present teachings is generally illustrated at reference numeral 10. The gasket 10 includes a main body 12 having a first or outer surface 14 (FIG. 1) and a second or inner surface 16 (FIG. 2). The main body 12 generally includes a first end 18, a second end 20 opposite to the first end 18, a first side surface 22, and a second side surface 24. The first side surface 22 and the second side surface 24 are generally opposite to one another. The first side surface 22 generally extends between the first end 18 and the second end 20. The second side surface 24 also generally extends between the first end 18 and the second end 20. An outer diameter surface 26 extends about, and generally defines, an outer periphery of the self-retaining gasket 10. The outer diameter surface 26 includes at least a portion of the first side surface 22 and the second side surface 24. The self-retaining gasket 10 can be made of any suitable material, such as any suitable polymer, rubber, or metallic material.

The main body 12 defines a first aperture 30a, a second aperture 30b, and a third aperture 32. The third aperture 32 is between the first aperture 30a and the second aperture 30b. The first aperture 30a is proximate to the first end 18, and the second aperture 30b is proximate to the second end 20. Each of the first aperture 30a, the second aperture 30b, and the third aperture 32 extend between the first surface 14 and the second surface 16.

The first aperture 30a includes a first side or portion 34a and a second side or portion 36a. At the first side 34a is a first tab 38a. At the second side 36a is a second tab 40a. Each of the first and second tabs 38a and 40a are retention tabs that extend out from within the first aperture 30a and away from the main body 12 beyond the second surface 16, as illustrated in FIG. 2 for example. The first and second tabs 38a and 40a are arranged opposite to one another, and are generally flexible.

The first aperture 30a defines a first concave surface 42a and a second concave surface 44a. The first and second concave surfaces 42a and 44a are arranged opposite to one another, and are between the first tab 38a and the second tab 40a. The first tab 38a, the second tab 40a, the first concave surface 42a, and the second concave surface 44a together generally define a first fastener clearance 46a. As explained further herein, the first fastener clearance 46a is sized and shaped to receive a suitable fastener therein without the fastener contacting the first tab 38a, the second tab 40a, the first concave surface 42a, or the second concave surface 44a.

The second aperture 30b is substantially similar to the first aperture 30a. At the second aperture 30b is a first tab 38b and a second tab 40b. The second aperture 30b, the first tab 38b, the second tab 40b, and the features thereof are illustrated with the same reference numbers as the first aperture 30a, the first tab 38a, the second tab 40a, and the features thereof, but with the reference numbers including the letter "b" instead of the letter "a." The description of the first aperture 30a, the first tab 38a, the second tab 40a, and the features thereof also applies to the second aperture 30b, the first tab 38b, the second tab 40b, and the features thereof.

With continued reference to FIGS. 1 and 2, and additional reference to FIG. 3, the first tab 38a includes a first distal end 48a and the second tab 40a includes a second distal end 50a. Proximate to the first distal end 48a, the first tab 38a includes a first curved portion or lip 52a. Proximate to the second distal end 50a, the second tab 40a includes a second curved portion or lip 54a. The first curved portion 52a and the second curved portion 54a curve away from one another and are generally C-shaped. The first and the second curved portions 52a and 54a are generally configured to provide an interference fit between the curved portions 52a and 54a and a smooth, flat, or planar surface in order to retain the gasket 10 at any suitable mounting location. For example, the first and the second curved portions 52a and 54a can be configured to mate with generally smooth or flat surface 66 of part 60 to provide an interference fit therewith, as illustrated in FIG. 3 and described herein.

With reference to FIG. 3, the gasket 10 is illustrated coupled to a part 60. The part 60 can be any suitable device, component, or material to which it would be desirable to mount the gasket 10 to. The part 60 defines a bore 62, which extends into the part 60 from an outer surface 64. Proximate to the outer surface 64, the bore 62 defines the generally smooth or flat surface 66.

The gasket 10 is arranged such that the second or inner surface 16 of the gasket 10 abuts the outer surface 64 of the part 60. The first tab 38a and the second tab 40a are seated within the bore 62, and are biased outward against the smooth or flat surface 66 of the bore 62 in order to retain the first and second tabs 38a and 40a within the bore 62 with an interference fit, and retain the gasket 10 against the outer surface 64 of the part 60. The first curved portion 52a of the first tab 38a and the second curved portion 54a of the second tab 40a are seated against the smooth or flat surface 66 in order to retain the first and second tabs 38a and 40a within the bore 62 with an interference fit and retain the gasket 10 against the outer surface 64 of the part 60.

Coupled to the part 60 is a fastener 70, which includes a head 72 and a shaft 74. The fastener 70 can be coupled to the part 60 with a retention device 76. The retention device 76 can be any suitable retention device, such as a retention sleeve sized and shaped to retain the fastener 70 therein with a friction fit. The fastener 70 is arranged such that the shaft 74 extends through the first fastener clearance 46a of the first aperture 30a without contacting the first tab 38a or the second tab 40a, or any portion of the first aperture 30a. The fastener 70, in particular the shaft 74, thus extends through the gasket 10 without contacting any portion thereof. As a result, the fastener 70 is free to rotate or be maneuvered in any manner in order to fasten the part 60 to any other suitable part. The gasket 10 is thus retained to the part 60 without contacting, or being coupled to, any portion of the fastener 70.

The first and second tabs 38b and 40b can be coupled to the part 60 at an additional bore of the part 60 that is similar to the bore 62. An additional fastener of the part 60 that is similar to the fastener 70 can be arranged at the additional bore in a manner that is similar to how the fastener 70 is arranged. The gasket 10 is coupled to the part 60 solely through interaction between the tabs 38a, 40a, 38b, and 40b. The outer diameter surface 26 is thus devoid of any fastening device or feature.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A self-retaining gasket comprising:
    a main body including a first planar surface and a second planar surface opposite to the first planar surface, the main body has a flat plate shape and is a single plate, the main body defining a first aperture extending between the first planar surface and the second planar surface;
    a fluid aperture defined by the main body spaced apart from the first aperture;
    a first retention tab extending from the main body at the first aperture; and
    a second retention tab extending from the main body at the first aperture;
   wherein:
    the first retention tab extends from the first planar surface toward and beyond the second planar surface and the second retention tab extends from the first planar surface toward and beyond the second planar surface;
    the first aperture defines a first side, a second side opposite to the first side, a first surface, and a second surface opposite to the first surface;
    the first surface and the second surface are both between the first retention tab and the second retention tab;
    the first retention tab is at the first side and the second retention tab is at the second side, the first retention tab and the second retention tab are arranged opposite to each other;
    a first fastener clearance is defined at the first aperture by the first side, the second side, the first surface, and the second surface;
    the first fastener clearance is spaced apart from each of the first retention tab, the second retention tab, the first surface, and the second surface to accommodate a fastener within the first aperture spaced apart from each of the first retention tab, the second retention tab, the first surface, and the second surface;

the first side and the second side each extend further from a center of the first fastener clearance than the first surface and the second surface; and the first retention tab extends from the main body at the first side, and the second retention tab extends from the main body at the second side.

2. The self-retaining gasket of claim 1, wherein the main body defines a second aperture that is substantially similar to the first aperture, a third retention tab extends from the main body at the second aperture, and a fourth retention tab extends from the main body at the second aperture, the third retention tab is opposite to the fourth retention tab.

3. The self-retaining gasket of claim 1, wherein the first retention tab and the second retention tab both extend generally perpendicular to the second planar surface.

4. The self-retaining gasket of claim 1, wherein the first retention tab includes a first curved portion spaced apart from a first distal end of the first retention tab, and the second retention tab includes a second curved portion spaced apart from a second distal end of the second retention tab; and wherein the first curved portion and the second curved portion are curved in opposition directions.

5. A self-retaining gasket comprising:

a main body including a first planar surface and a second planar surface opposite to the first planar surface, the main body has a flat plate shape and is a single plate, the main body defining a first aperture extending between the first planar surface and the second planar surface;

a fluid aperture defined by the main body spaced apart from the first aperture;

a first retention tab extending from the main body at the first aperture, the first retention tab extending from the first planar surface toward and beyond the second planar surface;

a second retention tab extending from the main body at the first aperture, the second retention tab extending from the first planar surface toward and beyond the second planar surface;

the first aperture defines a first side, a second side opposite to the first side, a first surface, and a second surface opposite to the first surface;

the first surface and the second surface are both between the first retention tab and the second retention tab;

the first retention tab is at the first side and the second retention tab is at the second side, the first retention tab and the second retention tab are arranged opposite to each other;

a first fastener clearance defined at the first aperture by the first side, the second side, the first surface, and the second surface, the first fastener clearance is spaced apart from each of the first retention tab, the second retention tab, the first surface, and the second surface to accommodate a fastener within the first aperture spaced apart from each of the first retention tab, the second retention tab, the first surface, and the second surface;

the first side and the second side each extend further from a center of the first fastener clearance than the first surface and the second surface; and the first retention tab extends from the main body at the first side, and the second retention tab extends from the main body at the second side.

6. The self-retaining gasket of claim 5, wherein the first retention tab and the second retention tab are both flexible.

7. The self-retaining gasket of claim 5, wherein the first retention tab includes a first curved portion spaced apart from a first distal end of the first retention tab, and the second retention tab includes a second curved portion spaced apart from a second distal end of the second retention tab.

8. The self-retaining gasket of claim 7, wherein the first curved portion and the second curved portion are curved in opposition directions.

9. The self-retaining gasket of claim 5, wherein the first retention tab and the second retention tab both extend generally perpendicular to the second planar surface.

10. The self-retaining gasket of claim 5, wherein the first surface is a first concave surface, and the second surface is a second concave surface.

11. The self-retaining gasket of claim 5, wherein the first planar surface and the second planar surface extend in parallel planes that are spaced apart.

12. The self-retaining gasket of claim 5, wherein the main body defines a second aperture that is substantially similar to the first aperture, a first retention tab extends from the main body at a first portion of the second aperture, a second retention tab extends from the main body at a second portion of the second aperture, the first retention tab of the second aperture is opposite to the second retention tab of the second aperture, a second fastener clearance is defined by the second aperture.

13. A self-retaining gasket comprising:

a main body including a first planar surface and a second planar surface opposite to the first planar surface, the main body has a flat plate shape and is a single plate, the main body defining a first aperture, a second aperture, and a third aperture for fluid between the first aperture and the second aperture, each of the first, second, and third apertures extend between the first planar surface and the second planar surface;

a first retention tab and a second retention tab each extending from the main body at opposite sides of the first aperture, the first and second retention tabs extending from the first surface toward and beyond the second planar surface;

a third retention tab and a fourth retention tab each extending from the main body at opposite sides of the second aperture, the third and fourth retention tabs extending from the first surface toward and beyond the second planar surface;

the first aperture defines a first side, a second side opposite to the first side, a first surface, and a second surface opposite to the first surface;

the first surface and the second surface are both between the first retention tab and the second retention tab;

the first retention tab is at the first side and the second retention tab is at the second side, the first retention tab and the second retention tab are arranged opposite to each other;

a first fastener clearance defined at the first aperture by the first side, the second side, the first surface, and the second surface, the first fastener clearance is spaced apart from each of the first retention tab, the second retention tab, the first surface, and the second surface to accommodate a first fastener within the first aperture spaced apart from each of the first retention tab, the second retention tab, the first surface, and the second surface;

the first side and the second side each extend further from a center of the first fastener clearance than the first surface and the second surface;

the first retention tab extends from the main body at the first side, and the second retention tab extends from the main body at the second side; and a second fastener clearance is defined by the second aperture, the second fastener clearance is substantially similar to the first fastener clearance, and the second aperture is substantially similar to the first aperture.

14. The self-retaining gasket of claim 13, wherein each of the first, second, third, and fourth retention tabs includes a curved portion proximate to a distal end thereof.

15. The self-retaining gasket of claim 13, wherein each of the first, second, third, and fourth retention tabs extend generally perpendicular to the second planar surface.

16. The self-retaining gasket of claim 1, wherein:
the first retention tab and the second retention tab extend generally linearly from the body and have a first distal end and second distal end respectively;
the first retention tab has a first curved portion proximate to the first distal end, the second retention tab has a second curved portion proximate to the second distal end;
the first curved portion and the second curved portion curve away from one another so as to provide an interference fit between the first and second curved portions and a surface of a bore defined by a part that the gasket is configured to couple to when the first and second retention tabs and are inserted into the bore;
the first surface and the second surface are opposite to one another and extend perpendicular to the first side and the second side; and
the first side and the second side are continuously connected to the first surface and the second surface respectively.

17. The self-retaining gasket of claim 5, wherein:
the first retention tab and the second retention tab extend generally linearly from the body and have a first distal end and second distal end respectively;
the first retention tab has a first curved portion proximate to the first distal end, the second retention tab has a second curved portion proximate to the second distal end;
the first curved portion and the second curved portion curve away from one another so as to provide an interference fit between the first and second curved portions and a surface of a bore defined by a part that the gasket is configured to couple to when the first and second retention tabs and are inserted into the bore;
the first surface and the second surface are opposite to one another and extend perpendicular to the first side and the second side; and
the first side and the second side are continuously connected to the first surface and the second surface respectively.

18. The self-retaining gasket of claim 13, wherein:
the first retention tab and the second retention tab extend generally linearly from the body and have a first distal end and second distal end respectively;
the first retention tab has a first curved portion proximate to the first distal end, the second retention tab has a second curved portion proximate to the second distal end;
the first curved portion and the second curved portion curve away from one another so as to provide an interference fit between the first and second curved portions and a surface of a bore defined by a part that the gasket is configured to couple to when the first and second retention tabs and are inserted into the bore;
the first surface and the second surface are opposite to one another and extend perpendicular to the first side and the second side; and
the first side and the second side are continuously connected to the first surface and the second surface respectively.

* * * * *